United States Patent
Zhuo et al.

(10) Patent No.: US 12,477,125 B2
(45) Date of Patent: Nov. 18, 2025

(54) LOSSLESS CODING AND DECODING SYSTEM AND METHOD THEREOF FOR REDUCING VIDEO TRANSMISSION BANDWIDTH

(71) Applicant: Xiamen RGBlink Science & Technology Co., Ltd., Fujian (CN)

(72) Inventors: Fuzhou Zhuo, Fujian (CN); Hongqing Hu, Fujian (CN)

(73) Assignee: Xiamen RGBlink Science & Technology Co., Ltd., Fujian (CN)

( * ) Notice: Subject to any disclaimer, the term of this patent is extended or adjusted under 35 U.S.C. 154(b) by 308 days.

(21) Appl. No.: 18/378,153

(22) Filed: Oct. 10, 2023

(65) Prior Publication Data

US 2024/0040132 A1    Feb. 1, 2024

(30) Foreign Application Priority Data

Apr. 3, 2023   (CN) .................. 202310345598.7

(51) Int. Cl.
*H04N 19/184* (2014.01)
*H04N 19/186* (2014.01)
*H04N 19/96* (2014.01)

(52) U.S. Cl.
CPC ......... *H04N 19/184* (2014.11); *H04N 19/186* (2014.11); *H04N 19/96* (2014.11)

(58) Field of Classification Search
None
See application file for complete search history.

(56) References Cited

U.S. PATENT DOCUMENTS 5,329,313 A * 7/1994 Keith .................. H04N 19/507
375/240.22

FOREIGN PATENT DOCUMENTS

| CN | 1309258 | C | * | 4/2007 | |
|---|---|---|---|---|---|
| CN | 1316812 | C | * | 5/2007 | ............. H04N 1/644 |
| CN | 101335897 | B | * | 8/2010 | ............. H04N 19/13 |
| CN | 102006482 | B | * | 8/2012 | |
| CN | 103402090 | A | * | 11/2013 | |
| EP | 0750426 | B1 | * | 10/2003 | ............... H04N 1/41 |
| KR | 100837410 | B1 | * | 6/2008 | ........... H04N 19/593 |

* cited by examiner

Primary Examiner — Ted W Barnes
(74) Attorney, Agent, or Firm — Birchwood IP (57) ABSTRACT

Disclosed by the present invention is a lossless coding and decoding method for reducing a video transmission bandwidth, thus improving real-time performance of a system. In addition, A floating-point number from probability calculation is prevented from affecting the coding. Two-stage compression improves the compression ratio with simple and practical operations. The present invention greatly reduces the bandwidth resources occupied in the video transmission process, thus having extremely high application value in the occasions with requirements for high-quality video image.

3 Claims, 3 Drawing Sheets

LOSSLESS CODING AND DECODING SYSTEM AND METHOD THEREOF FOR REDUCING VIDEO TRANSMISSION BANDWIDTH

TECHNICAL FIELD

The present invention belongs to the field of image processing technology, and particularly relates to a lossless coding and decoding system and a method thereof for reducing video transmission bandwidth.

BACKGROUND OF THE INVENTION

Digital image processing technology develops rapidly and plays an irreplaceable role in our society, and it has been widely used in aerospace, communication, medicine, industrial production and other fields. With the increasing demand for high-quality images in the industry, the massive information of existing video transmission technology is becoming a problem to be solved urgently. As a system that may perform real-time pipeline operation, an FPGA meets people's requirements for high-speed and high-quality digital image processing in the field of image processing. In an FPGA-based real-time video image processing process, very high bandwidth is required for storage and transmission of the massive original data from real-time video images. In order to meet the bandwidth requirement, a common method is lossy compression based on H.264/H.265 protocol. The method greatly reduces the bandwidth resources occupied during video transmission, but the lossy compression is increasingly difficult to meet people's requirements for image quality during the image processing. The conventional lossless compression processing methods including Huffman coding have the shortcoming of low compression ratio.

BRIEF SUMMARY OF THE INVENTION

The object of the present invention is to provide a lossless coding and decoding system and a method thereof for reducing a video transmission bandwidth, which preserve all information of images while reducing the transmission bandwidth, and further improve compression ratio by adding a pre-processing operation, thus having the advantages of wide applicability, high real-time performance and low bandwidth resource usage for compression of videos in different resolutions.

The present invention provides the lossless coding and decoding method for reducing the video transmission bandwidth, which mainly includes a coding step and a decoding step of video stream data, where, the coding step and the decoding step are reversible operations due to lossless compression; and includes the following steps:

step 1, the step of encoding the video stream data:
(1) a pre-processing module performs one-step parallel pre-processing of three color components of a pixel:
regarding an image with a resolution of M×N, the pre-processing module splits 24-bit-wide image data in Row i into three 8-bit-wide arrays in the order of R, G and B, namely, data_R[i,j], data_G[i,j] and data_B[i,j], where, $i \in [1,N]$, $j \in [1,M]$; processing the three arrays of data as follows:
retaining the array in Column 1 and Row i as a reference, and subtracting each item from the next item to generate new arrays in Row i, namely, difdata_R[i,j], difdata_G[i,j] and difdata_B[i,j]:

$$\text{difdata}[i,j] = \text{data}[i,j] - \text{data}[i,j-1], \text{ where, } i \in [1,N], j \in [2,M];$$

(2) a Huffman coding module performs Huffman coding based on the principle of Huffman coding, the Huffman coding module encodes the pre-processed array difdata [i,j] in Row i to generate coding table information and compressed coded data string information, and the pre-processing module pre-processes data[i+1,j] in Row i+1 at the same time; the coding table covers the hexadecimal data in each of the arrays, corresponding numbers of occurrences of the hexadecimal data, and binary data and coded data corresponding to the hexadecimal data, with regard to array difdata_R[i,j], counting the numbers of occurrences of all hexadecimal data and sorting in a descending frequency order, selecting two hexadecimal data with the lowest frequencies, giving a weight of 0 to the lower hexadecimal data and a weight of 1 to the higher hexadecimal data, summing over the two frequencies and comparing with other items to select the two with the lowest frequencies, and giving a weight of 0 to the lower hexadecimal data and a weight of 1 to the higher hexadecimal data again, repeating the above process to finally generate a Huffman coding tree, where, leaf nodes of the Huffman coding tree are 0-weighted or 1-weighted, and the leaf nodes without child node each represent one hexadecimal data, reading the weight of each hexadecimal data from a root node to the bottom until it reaches the leaf node corresponding to the hexadecimal data, obtaining the coded data corresponding to the hexadecimal data, and replacing the binary data corresponding to the original hexadecimal data by the coded data, thus achieving a compression effect;
(3) a data packaging module splits the data output by the Huffman coding module into a frame format including a frame header, a data bit and a stop bit, and packages into a 32-bit-wide data packet for sending;
(4) a new enable signal generating module newly generates a valid display data strobe signal DataValid when the coding table information is sent, the third bit of the frame header of the data packet is at a low level, when a change from high level to low level is detected at the third bit of the frame header, it means that data in another row starts to be sent, in that case, the valid display data strobe signal DataValid is pulled up, indicating that the coding table information is under transmission, when the stop bits of all of the three color components are pulled up, the valid display data strobe signal DataValid is pulled down, in the process of sending the coding table information and the compressed coded data string information, the valid display data strobe signal DataValid remained at a high level indicates that valid data is under transmission; and
step 2, the step of decoding the video stream data:
(1) a Huffman decoding module splits and splices the data packet received via a data receiving module to obtain the coding table information and the complete compressed coded data string information, then decodes the information according to the principle of Huffman decoding, and an image restoration module recovers the original video stream data with the decoded data;
(2) recovery of a DE signal, an HS signal and a VS signal a horizontal synchronizing signal and a field synchronizing signal are not transmitted on a high-speed serial bus and need to be processed in parallel with the decoding of the data string; incrementing a counter by 1 whenever a data array is decoded, judging a horizontal resolution of the image transmitted according to different counter values, obtaining a vertical resolution of the image according to the number of times of pulling up the stop bit, and finally regenerating the DE signal, the HS signal and the VS signal according to relevant specifications of the CTA-861 standard;

(3) Image Data Recovery obtaining the decoded data difdata_R, difdata_G and difdata_B; taking the Component R as an example, based on the array data_R[i,1] in Column 1 and Row i, for the array data_R[j] in Column j, there is:

$$data\_R[j]=data\_R[j-1]+difdata\_R[j], j\in[2,1920];$$

and splicing the data of the Component R, the Component G and the Component B into 24-bit-wide image data Data[i,j] to complete the decoding, and recovering the original video stream data and outputting it together with the HS signal, the VS signal and the DE signal generated by an HS signal generating module, a VS signal generating module and a DE signal generating module, where, the Data[i,j]={data_R[i,j],data_G[i,j], data_B[i,j]}.

When splitting and splicing the data packet received, the Huffman decoding module judges the color component which the pixel data belongs to according to the frame header information of the data packet; receives the coding table information when the third bit is at the low level, or continuously receives the compressed coded data string information when the third bit is at the high level, stops receiving when detecting a high-level stop bit of the current row, and starts to decode the information according to the coding table; and decodes and recovers the data according to the coding table after reading through the data in a row and getting the complete compressed coded data string information, that is, the first data refers to all data sent in difdata[i,1] when the third bit of the frame header jumps from the low level to the high level, directly reads 8-bit data string information, decodes the subsequent frame data bits according to the coding table, and then reads the data sequentially from left to right to obtain hexadecimal data and finally splices a difdata[i].

The technical solution of the present invention is suitable for application fields of image processing, digital video technology and so forth. A step is added for one-step parallel pre-processing of three color components (R, G and B) of a pixel before Huffman coding to improve the compression efficiency, particularly, only one row of data is required to be cached in the pre-processing step, thus improving real-time performance of a system and increasing applicable scenarios thereof. In addition, occurrences of pixel data are counted as a basis for Huffman coding, so that a floating-point number from probability calculation is prevented from affecting the coding. Moreover, two-stage compression improves the compression ratio with simple and practical operations. Combined with a unique data frame format, an image resolution is obtained during decoding. Finally, DE signal, HS signal and VS signal are generated according to CTA-861 standard to realize 100% data recovery in the decoding process without sending horizontal synchronizing information or field synchronizing information. The present invention greatly reduces the bandwidth resources occupied in the video transmission process while ensuring that the pixel data is not lost in the video streaming delivery process, thus having extremely high application value in the occasions with requirements for high-quality video image.

DETAILED DESCRIPTION OF THE INVENTION

The present invention will be further described in details as follows in combination with the accompanying drawings for a clear understanding of the objects, technical solutions and advantages of the present invention. Apparently, the embodiments described are only some, not all of the embodiments of the present invention. Based on the embodiments of the present invention, all other embodiments obtained by those of ordinary skill in the art without creative work are within the protection scope of the present invention.

Example 1

Figure 1:
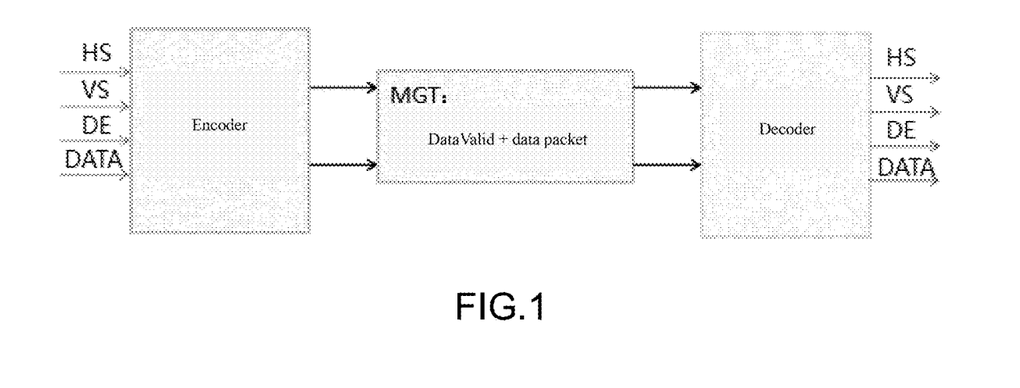
FIG. 1 is a flow chart of the present invention.

Referring to FIG. 1, the present invention provides a lossless coding and decoding system for reducing the video transmission bandwidth, which includes an encoder at the output end, an MGT (multi-gigabit transceiver) and a decoder at the receiving end; and the encoder compresses, splits and packages the input original video stream data and then transmits it through the MGT, and the decoder decodes the data packet at the receiving end and recovers the original video stream data for further use.

The original video stream data input to the encoder includes a horizontal synchronizing signal (HS/HSYNC), a field synchronizing signal (VS/VSYNC), a valid display data strobe signal (DE) and 24-bit-wide image data (Data); where, the image data (Data) is in RGB888 format; the pulled up horizontal synchronizing signal (HS/HSYNC) indicates that a new row of image data will be processed; and the pulled up field synchronizing signal (VS/VSYNC) indicates that a new frame of image data will be processed.

Figure 2:
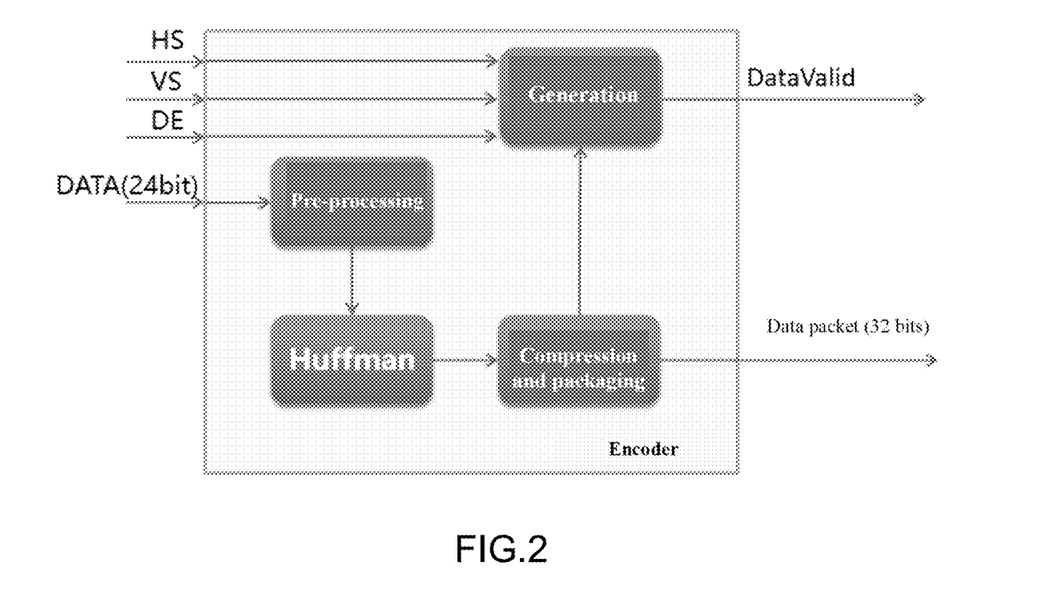
FIG. 2 is a flow chart of a coding process realized with the present encoder.

Referring to FIG. 2, the encoder includes a pre-processing module, a Huffman coding module, a data packaging module and a new enable signal generating module, the original video stream data is input to the encoder, a pre-processing module performs one-step parallel pre-processing of three color components of a pixel. After digitization of the regularity of the image data, the data is sent to the Huffman coding module for Huffman coding, so as to obtain coding table information and compressed coded data string information, which is split and packaged into a 32-bit-wide data packet through the data packaging module and sent to the MGT together with a DataValid signal newly generated by the new enable signal generating module, where, the DataValid signal refers to the valid display data strobe signal transmitted on a high-speed serial bus. When the data packet is transmitted from the encoder to the MGT, the coding table information is sent first, followed by the compressed coded data string information;

The pre-processing module performs one-step parallel pre-processing of the three color components of one pixel: regarding an image with a resolution of M×N, the 24-bit-wide image data (Data) in Row i is split into three 8-bit-wide arrays in the order of R, G and B, thus obtaining data_R[i,j], data_G[i,j] and data_B[i,j] in Row i (i∈[1,N]) and Column j (j∈[1,M]). The three arrays of data are processed as follows: the array in Column 1 and Row i is retained as a reference, and each item is subtracted from its next item to generate new arrays in Row i, namely, difdata_R[i,j], difdata_G[i,j] and difdata_B[i,j]:

$$difdata[i,j]=data[i,j]-data[i,j-1], i \in [1,N], j \in [2,M];$$

Figure 5:
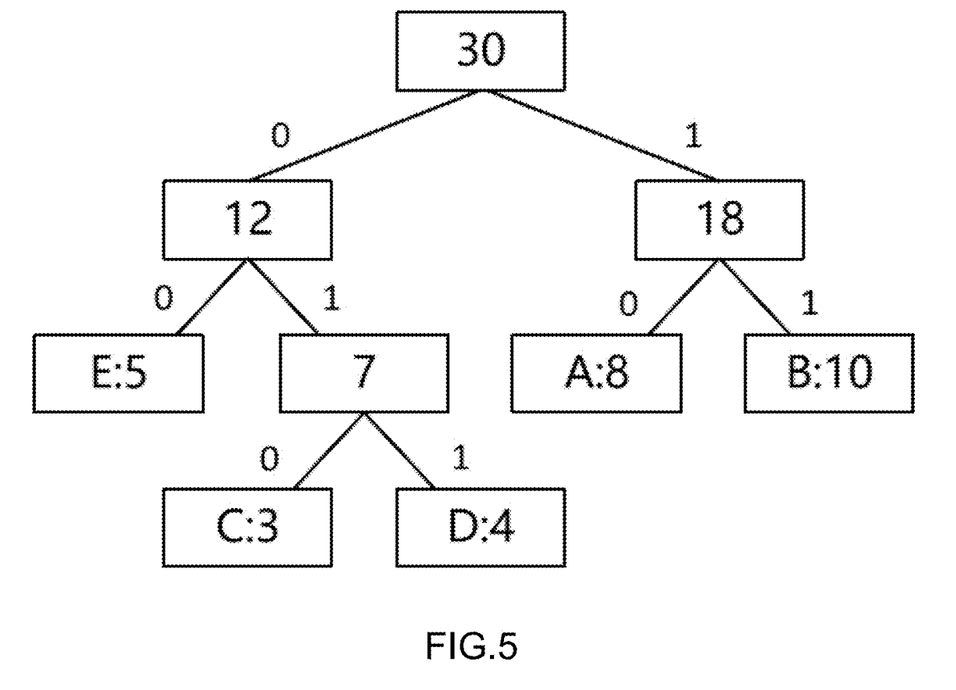
FIG. 5 is a Huffman coding tree generated based on a coding table of the present invention.

Based on the principle of Huffman coding, the Huffman coding module encodes the pre-processed array data[i,j] in Row i to generate the coding table information and the compressed coded data string information, and the pre-processing module pre-processes the array data[i+1,j] in Row i+1 at the same time. the coding table covers hexadecimal data in each of the arrays, corresponding numbers of occurrences of the hexadecimal data, and binary data and coded data corresponding to the hexadecimal data. Taking the coding process of the array difdata_R[i,j] as an example, the content of the array is assumed to be "0xBA 0xCA 0xDA 0xBB 0xCB 0xAB 0xEB 0xED 0xDA 0xBE 0xEE 0xBB", the numbers of occurrences of all hexadecimal data are counted and sorted in a descending frequency order, two hexadecimal data C and D with the lowest frequencies are selected, a weight of 0 is given to the lower C and a weight of 1 is given to the higher D, the two frequencies are summed up and compared with other items, it is found that the lowest frequencies are 5 (corresponding to E) and 7 (corresponding to C+D), and a weight of 0 is given to the lower one and a weight of 1 is given to the higher one again. In this way, the process is repeated to finally generate a Huffman coding tree, where, leaf nodes of the Huffman coding tree are 0-weighted or 1-weighted, and the leaf nodes without child node each represent one hexadecimal data, the weight of each hexadecimal data is read from a root node to the bottom until it reaches the leaf node corresponding to the hexadecimal data, thus obtaining the coded data corresponding to the hexadecimal data. For example, D corresponds to the coded data of "011". Ultimately, the binary data corresponding to the original hexadecimal data is replaced by the coded data in the coding table to achieve a compression effect. For example, BA corresponds to the binary data of "10111010", while the coded data corresponds to "1110".

The data packaging module splits the data output by the Huffman coding module into a format including a frame header, a data bit and a stop bit, and packages into a 32-bit-wide data packet for sending. The data packet has the frame format as follows:

the frame header, located at the beginning of one data frame and consisting of 3 bits, where, the first two bits indicate the color component (R or G or B) the current data belongs to with 00 or 01 or 11; the third bit indicates classification of data transmitted via the data bit, to be specific, the data classification refers to the coding table information or the compressed coded data string information transmitted via the data bit; for example, "0" indicates the coding table information and "1" indicates the compressed coded data string information;

the data bit, located in the middle of the data frame and consisting of 28 bits, where, the data bit information is divided into two classes: a first class, where, all columns in the coding table generated by the Huffman coding module are separately packaged for sending, including the uncoded hexadecimal data and the coded data; and a second class, where the compressed coded data string is sliced to the maximum width of 28 bits and stored in the data bits to be sent to minimize the transmission time; and the stop bit, pulled up upon conversion of a whole row of data and remained at a low level in normal times.

The new enable signal generating module newly generates a valid display data strobe signal DataValid, when the coding table information is sent, the third bit of the frame header of the data packet is at a low level, when a change from high level to low level is detected at the third bit of the frame header, it means that data in another row starts to be sent, in that case, the valid display data strobe signal DataValid is pulled up, indicating that the coding table information is under transmission, when the stop bits of all of the three color components are pulled up, the valid display data strobe signal DataValid is pulled down, in the process of data sending, the valid display data strobe signal DataValid remained at a high level indicates that valid data is under transmission.

Figure 3:
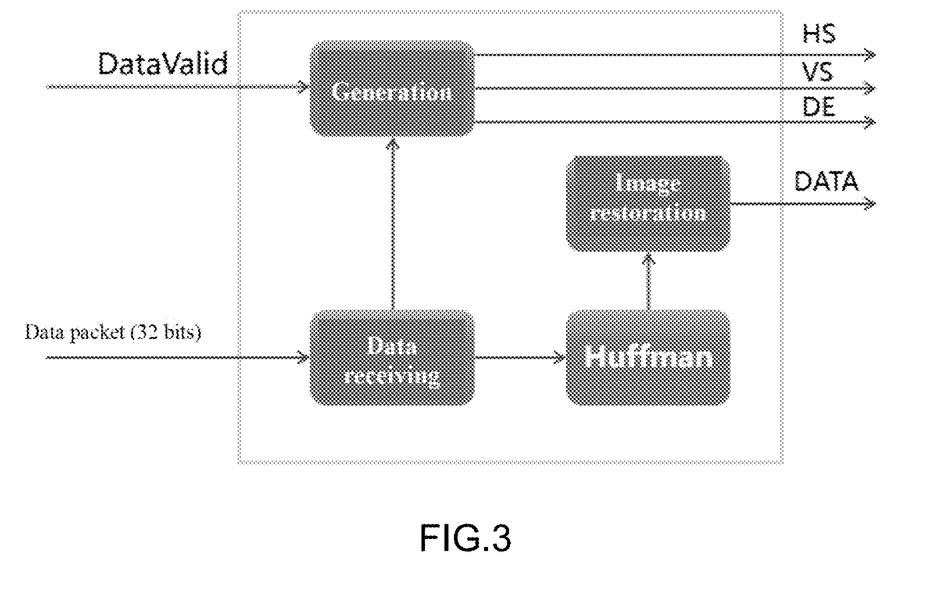
FIG. 3 is a flow chart of a decoding process realized with the present decoder.

Referring to FIG. 3, the decoder includes a data receiving module, a Huffman decoding module, an image restoration module as well as an HS signal generating module, a VS signal generating module and a DE signal generating module. The data receiving module receives a data packet from the MGT, the Huffman decoding module splits and splices the data packet received via the data receiving module to obtain the coding table information and the complete compressed coded data string information, then decodes the information according to the principle of Huffman decoding, the image restoration module recovers the original video stream data with the decoded data, and the obtained original video stream data is output together with the HS signal, the VS signal and the DE signal generated by the HS signal generating module, the VS signal generating module and the DE signal generating module.

The data receiving module receives the data packet from the MGT and sends to the Huffman decoding module.

The Huffman decoding module splits and splices the data packet received via the data receiving module to obtain the coding table information and the complete compressed coded data string information, and then decodes the information according to the principle of Huffman decoding. When splitting and splicing the data packet, the Huffman decoding module judges the color component which the pixel data belongs to according to the information of first 2 bits in the frame header of the data packet. In the first 2 bits: "00" indicates Component R, "01" indicates Component G and "11" indicates Component B for the current frame. The Huffman decoding module receives the coding table information when the third bit is at the low level, or continuously receives the compressed coded data string information when the third bit is at the high level, and then stops receiving when detecting a high-level stop bit of the current row; decodes and recovers the data according to the coding table after reading through the data in a row and getting the complete compressed coded data string information, that is, the first array refers to all data sent in difdata[i,1] when the third bit of the frame header jumps from the low level to the high level, directly reads 8-bit data information, decodes the subsequent frame data bits according to the coding table, and then reads the data sequentially from left to right to obtain hexadecimal data and finally splices a difdata[i].

The image restoration module obtains the decoded data difdata_R, difdata_G and difdata_B, taking the Component R as an example, based on the array data_R[i,1] in Column 1 and Row i, for the array data_R[j] in Column j, there is:

data_$R[i,j]$=data_$R[i,j-1]$+difdata_$R[i,j], j \in [2,1920]$;

and the module splices the data of the Component R, the Component G and the Component B into 24-bit-wide image data Data[i,j] to complete the decoding, and recovers the original video stream data and outputs it together with the HS signal, the VS signal and the DE signal generated by the HS signal generating module, the VS signal generating module and the DE signal generating module, where, the Data[i,j]={data_R[i,j], data_G[i,j],data_B[i,j]}.

The HS signal generating module, the VS signal generating module and the DE signal generating module are used to generate the HS signal, the VS signal and the DE signal, which are output together with the recovered and obtained original video stream data. Where, a horizontal synchronizing signal and a field synchronizing signal are not transmitted on a high-speed serial bus and need to be processed in parallel with the decoding of the data string; a counter is incremented by 1 whenever a data array is decoded, a horizontal resolution of the image transmitted is judged according to different counter values, a vertical resolution of the image is obtained according to the number of times of pulling up the stop bit, and finally, the DE signal, the HS signal and the VS signal are regenerated according to relevant specifications of the CTA-861 standard.

Example 2

The present invention provides a lossless coding and decoding method for reducing a video transmission bandwidth, which mainly includes a coding step and a decoding step of video stream data, where, the coding step and the decoding step are reversible operations due to lossless compression; and specifically includes the following steps:

Step 1, the step of encoding the video stream data (1) A pre-processing module performs one-step parallel pre-processing of three color components of a pixel.

Regarding an image with a resolution of M×N, the pre-processing module splits 24-bit-wide image data (Data) in Row i into three 8-bit-wide arrays in the order of R, G and B, namely, data_R[i,j], data_G[i,j] and data_B[i,j], where, $i \in [1,N]$, in Column j ($j \in [1,M]$); the three arrays of data are processed as follows: the array in Column 1 and Row i is retained as a reference, and each item is subtracted from its next item to generate new arrays in Row i, namely, difdata_R[i,j], difdata_G[i,j] and difdata_B[i,j]:

difdata$[i,j]$=data$[i,j]$−data$[i,j-1]$, where, $i \in [1,N], j \in [2,M]$;

(2) A Huffman Coding Module Performs Huffman Coding

Based on the principle of Huffman coding, the Huffman coding module encodes the pre-processed array difdata[i,j] in Row i to generate coding table information and compressed coded data string information, and the pre-processing module pre-processes data[i+1,j] in Row i+1 at the same time. The coding table covers the hexadecimal data in each of the arrays, corresponding numbers of occurrences of the hexadecimal data, and binary data and coded data corresponding to the hexadecimal data, with regard to array difdata_R[i,j], the numbers of occurrences of all hexadecimal data are counted and sorted in a descending frequency order, two hexadecimal data with the lowest frequencies are selected, a weight of 0 is given to the lower hexadecimal data and a weight of 1 is given to the higher hexadecimal data, the two frequencies are summed up and compared with other items to select the two with the lowest frequencies, and a weight of 0 is given to the lower hexadecimal data and a weight of 1 is given to the higher hexadecimal data again, the above process is repeated to finally generate a Huffman coding tree, where, leaf nodes of the Huffman coding tree are 0-weighted or 1-weighted, and the leaf nodes without child node each represent one hexadecimal data, the weight of each hexadecimal data is read from a root node to the bottom until it reaches the leaf node corresponding to the hexadecimal data, the coded data corresponding to the hexadecimal data is obtained, and the binary data corresponding to the original hexadecimal data is replaced by the coded data, thus achieving a compression effect.

(3) A data packaging module splits the data output by the Huffman coding module into a format including a frame header, a data bit and a stop bit, and packages into a 32-bit-wide data packet for sending. The data packet has the frame format as follows:

The frame header, located at the beginning of one data frame and consisting of 3 bits, where, the first two bits indicate the color component (R or G or B) the current data belongs to with 00 or 01 or 11. The third bit indicates classification of data transmitted via the data bit, to be specific, the data classification refers to the coding table information or the compressed coded data string information transmitted via the data bit; for example, "0" indicates the coding table information and "1" indicates the compressed coded data string information.

The data bit, located in the middle of the data frame and consisting of 28 bits, where, the data bit information is divided into two classes: a first class, where, all columns in the coding table generated by the Huffman coding module are separately packaged for sending, including the uncoded hexadecimal data and the coded data; and a second class, where the compressed coded data string is sliced to the maximum width of 28 bits and stored in the data bits to be sent to minimize the transmission time.

The stop bit, pulled up upon conversion of a whole row of data and remained at a low level in normal times.

It is assumed that the information in the coding table (Table 1) is Component R, the array difdata_R is coded to get "1110 1110 01010 01010 01110 01110 1111 01011 1011 0011 00011 01110 1100 0000 1111", and the coding table information is sent first. Taking 0xB as an example, "0x16 0x00 0x06" would be obtained; or taking 0xC as an example, "0x18 0x00 0x04" would be obtained. The data bits are transmitted after sending the coding table information. It can be seen that the compressed coded data string has a total length of 67 bits, and three data packets of "0x3D 0xCA 0x53 0x9C", "0x3E 0xBB 0x31 0xBA" and "0x30 0x3C 0x00 0x01" would be obtained.

(4) A New Enable Signal Generating Module Newly Generates a Valid Display Data Strobe Signal DataValid When the coding table information is sent, the third bit of the frame header of the data packet is at a low level, when a change from high level to low level is detected at the third bit of the frame header, it means that data in another row starts to be sent, in that case, the valid display data strobe signal DataValid is pulled up, indicating that the coding table information is under transmission, when the stop bits of all of the three color components are pulled up, the valid display data strobe signal DataValid is pulled down, in the process of sending the coding table information and the compressed coded data string information, the valid display data strobe signal DataValid remained at a high level indicates that valid data is under transmission.

Step 2, The Step of Decoding the Video Stream Data (1) A Huffman decoding module splits and splices the data packet received via a data receiving module to obtain the coding table information and the complete compressed coded data string information, then decodes the information according to the principle of Huffman decoding, and an image restoration module recovers the original video stream data with the decoded data.

The Huffman decoding module judges the color component which the pixel data belongs to according to the information of the frame header of the data packet. In the first 2 bits: "00" indicates Component R, "01" indicates Component G and "11" indicates Component B for the current frame; receives the coding table information when the third bit is at the low level, or continuously receives the compressed coded data string information when the third bit is at the high level, stops receiving when detecting a high-level stop bit of the current row, and starts to decode the information according to the coding table; and decodes and recovers the data according to the coding table after reading through the data in a row and getting the complete compressed coded data string information. In this way, the decoding error caused by splitting one pixel data into two parts during the coding process.

The first array refers to all data sent in difdata[i,1] when the third bit of the frame header jumps from the low level to the high level, the Huffman decoding module directly reads 8-bit-wide data string information, decodes the subsequent frame data bits according to the coding table. As shown in Table 1, after coding characters, the high bit varies between a short code and a long code (high on the left and low on the right), so as to prevent interpretation of the long code as the characters corresponding to the short code. Hence, as for the following compressed coded string "11 1011 1001 0100 1110", "BA CA DA" is obtained by sequentially reading from left to right according to the coding table (Table 1) without ambiguity, and finally spliced into an array difdata [i].

TABLE 1

| Hexadecimal data | Number of occurrences | Binary data | Coded data |
|---|---|---|---|
| B | 10 | 1011 | 11 |
| A | 8 | 1010 | 10 |
| E | 5 | 1111 | 00 |
| D | 4 | 1101 | 011 |
| C | 3 | 1100 | 010 |

(2) Recovery of a DE Signal, an HS Signal and a VS Signal

A horizontal synchronizing signal and a field synchronizing signal are not transmitted on a high-speed serial bus and need to be processed in parallel with the decoding of the data string; a counter is incremented by 1 whenever a data array is decoded, and a resolution of the image transmitted is judged according to different counter values. For example, when a pulled up stop bit of a frame is detected, the counter value is judged immediately, and when the counter value is 1920, the horizontal resolution of the image is judged to be 1920. The present system is for compressed transmission of real-time video stream data. Since a video field blanking interval is much longer than a video row blanking interval, it is easy to judge whether the video is at the field blanking interval according to the interruption period of transmission of the data stream. After that, a vertical resolution of the image is obtained according to the number of times of pulling up the stop bit, and finally, the DE signal, the HS signal and the VS signal are regenerated according to relevant specifications of the CTA-861 standard.

(3) Image Data Recovery

The decoded data difdata_R, difdata_G and difdata_B are obtained. Taking the Component R as an example, based on the array data_R[i,1] in Column 1 and Row i, for the array data_R[j] in Column j and Row i, there is:

$$\text{data\_}R[i,j]=\text{data\_}R[i,j-1]+\text{difdata\_}R[i,j], j\in[2,1920].$$

The data of the Component R, the Component G and the Component B are spliced into 24-bit-wide image data Data [i,j] to complete the decoding, and the original video stream data is recovered and output together with the HS signal, the VS signal and the DE signal generated by an HS signal generating module, a VS signal generating module and a DE signal generating module, where, the Data[i,j]={data_R[i,j], data_G[i,j],data_B[i,j]}.

Because of the correlation between adjacent pixels, the pixel value of the image almost increases or decreases in a linear way. By adding the one-step pre-processing operation with the pre-processing module, the regularity of the image information is digitized. Combined with the characteristics of changing image, the pre-processing operation is intended to integrate the changes of image data in a more regular way, thus simplifying the complexity of compression.

Figure 4:
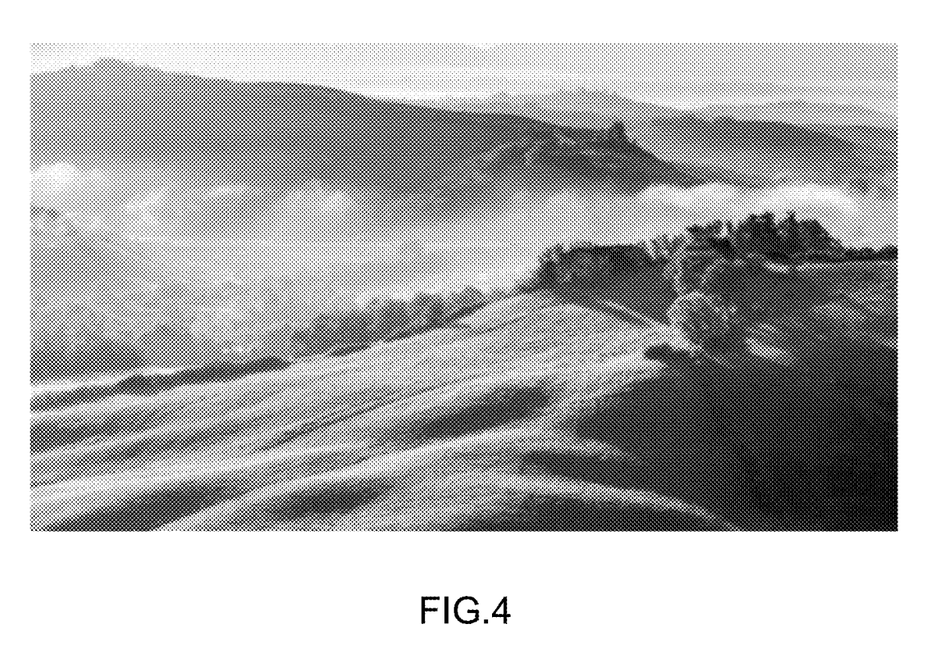
FIG. 4 is a simulated image for sample codes.

The sample codes are a code program written using MATLAB language to compress the pixel information of different images and count the compressions according to the present method. After a simulated image as shown in FIG. 4 is compiled with the sample codes, a report is obtained, which records the total width of the compressed data from different color components of the same image, as shown in Table 2. Taking the Component R as an example, the resolution of FIG. 4 is 1920 (pixel)×1080 (pixel), and the data bit width of each color component is 8 bits, so the total number of bits of data to be transmitted for the Component R is 1920 (pixel)×1080 (pixel)×8 (bit)=16,588,800 (bit).

TABLE 2

|  | Huffman coding | Compression ratio | The present coding method | Compression ratio |
|---|---|---|---|---|
| Component R | 14656072 | 88.35% | 8044574 | 48.49% |
| Component G | 14459207 | 87.16% | 8006274 | 48.26% |
| Component B | 13769120 | 83% | 8000880 | 48.23% |

As shown in Table 2, the compression ratio of the Component R subject to Huffman coding is 88.35%. With the present encoding method and the additional one-step pre-processing, the total bit width of the recompressed data only reaches 48.49% of the original size, thus greatly improving the compression effect.

What is claimed is:

1. A lossless coding and decoding method for reducing video transmission bandwidth, mainly comprising a coding step and a decoding step of video stream data, where, the coding step and the decoding step are reversible operations due to lossless compression; and characterized by comprising the following steps:
step 1, the step of encoding the video stream data:
(1) a pre-processing module performs one-step parallel pre-processing of three color components of a pixel:
regarding an image with a resolution of M×N, the pre-processing module splits 24-bit-wide image data in Row i into three 8-bit-wide arrays in the order of R, G and B, namely, data_R[i,j], data_G[i,j] and data_B[i,j], where, i∈[1,N], j∈[1,M]; processing the three arrays of data as follows:
retaining the array in Column 1 and Row i as a reference, and subtracting each item from the next item to generate new arrays in Row i, namely, difdata_R[i,j], difdata_G[i,j] and difdata_B[i,j]:

difdata[i,j]=data[i,j]−data[i,j−1], where, i∈[1,N],j∈[2,M];

(2) a Huffman coding module performs Huffman coding based on the principle of Huffman coding, the Huffman coding module encodes the pre-processed array difdata [i,j] in Row i to generate coding table information and compressed coded data string information, and the pre-processing module pre-processes data[i+1,j] in Row i+1 at the same time; the coding table covers the hexadecimal data in each of the arrays, corresponding numbers of occurrences of the hexadecimal data, and binary data and coded data corresponding to the hexadecimal data, with regard to array deflator[obj], counting the numbers of occurrences of all hexadecimal data and sorting in a descending frequency order, selecting two hexadecimal data with the lowest frequencies, giving a weight of 0 to the lower hexadecimal data and a weight of 1 to the higher hexadecimal data, summing over the two frequencies and comparing with other items to select the two with the lowest frequencies, and giving a weight of 0 to the lower hexadecimal data and a weight of 1 to the higher hexadecimal data again, repeating the above process to finally generate a Huffman coding tree, where, leaf nodes of the Huffman coding tree are 0-weighted or 1-weighted, and the leaf nodes without child node each represent one hexadecimal data, reading the weight of each hexadecimal data from a root node to the bottom until it reaches the leaf node corresponding to the hexadecimal data, obtaining the coded data corresponding to the hexadecimal data, and replacing the binary data corresponding to the original hexadecimal data by the coded data, thus achieving a compression effect;
(3) a data packaging module splits the data output by the Huffman coding module into a frame format comprising a frame header, a data bit and a stop bit, and packages into a 32-bit-wide data packet for sending;
(4) a new enable signal generating module newly generates a valid display data strobe signal DataValid
when the coding table information is sent, the third bit of the frame header of the data packet is at a low level, when a change from high level to low level is detected at the third bit of the frame header, it means that data in another row starts to be sent, in that case, the valid display data strobe signal DataValid is pulled up, indicating that the coding table information is under transmission, when the stop bits of all of the three color components are pulled up, the valid display data strobe signal DataValid is pulled down, in the process of sending the coding table information and the compressed coded data string information, the valid display data strobe signal DataValid remained at a high level indicates that valid data is under transmission; and
step 2, the step of decoding the video stream data:
(1) a Huffman decoding module splits and splices the data packet received via a data receiving module to obtain the coding table information and the complete compressed coded data string information, then decodes the information according to the principle of Huffman decoding, and an image restoration module recovers the original video stream data with the decoded data;
(2) recovery of a DE signal, an HS signal and a VS signal
a horizontal synchronizing signal and a field synchronizing signal are not transmitted on a high-speed serial bus and need to be processed in parallel with the decoding of the data string; incrementing a counter by 1 whenever a data array is decoded, judging a horizontal resolution of the image transmitted according to different counter values, obtaining a vertical resolution of the image according to the number of times of pulling up the stop bit, and finally regenerating the DE signal, the HS signal and the VS signal according to relevant specifications of the CTA-861 standard;
(3) image data recovery
obtaining the decoded data difdata_R, difdata_G and difdata_B; taking the Component R as an example, based on the array data_R[i,1] in Column 1 and Row i, for the array data_R[j] in Column j, there is:

data_R[j]=data_R[j−1]+difdata_R[j],j∈[2,1920];

and splicing the data of the Component R, the Component G and the Component B into 24-bit-wide image data Data[i,j] to complete the decoding, and recovering the original video stream data and outputting it together with the HS signal, the VS signal and the DE signal generated by an HS signal generating module, a VS signal generating module and a DE signal generating module, where, the Data[i,j]={data_R[i,j],data_G[i,j], data_B[i,j]}.

2. The lossless coding and decoding method for reducing the video transmission bandwidth according to claim 1, characterized in that the data packet has the frame format as follows:
the frame header, located at the beginning of one data frame and consisting of 3 bits, where, the first two bits indicate the color component the current data belongs to; the third bit indicates classification of data transmitted via the data bit, to be specific, the data classification refers to the coding table information or the compressed coded data string information transmitted via the data bit;
the data bit, located in the middle of the data frame and consisting of 28 bits, where, the data bit information is divided into two classes: a first class, where, all columns in the coding table generated by the Huffman coding module are separately packaged for sending, comprising the uncoded hexadecimal data and the coded data; and a second class, where the compressed coded data string is sliced to the maximum width of 28 bits and stored in the data bits to be sent; and
the stop bit, pulled up upon conversion of a whole row of data and remained at a low level in normal times.

3. The lossless coding and decoding method for reducing the video transmission bandwidth according to claim 1, characterized in that when splitting and splicing the data packet received, the Huffman decoding module judges the color component which the pixel data belongs to according to the frame header information of the data packet; receives the coding table information when the third bit is at the low level, or continuously receives the compressed coded data string information when the third bit is at the high level, stops receiving when detecting a high-level stop bit of the current row, and starts to decode the information according to the coding table; and decodes and recovers the data according to the coding table after reading through the data in a row and getting the complete compressed coded data string information, that is, the first data refers to all data sent in difdata[i,1] when the third bit of the frame header jumps from the low level to the high level, directly reads 8-bit data string information, decodes the subsequent frame data bits according to the coding table, and then reads the data sequentially from left to right to obtain hexadecimal data and finally splices a difdata[i].

* * * * *